United States Patent
Kim

(10) Patent No.: US 12,238,593 B2
(45) Date of Patent: Feb. 25, 2025

(54) METHOD AND APPARATUS FOR SECONDARY BASE STATION CHANGE IN MOBILE WIRELESS COMMUNICATION SYSTEM

(71) Applicant: BLACKPIN INC., Seoul (KR)

(72) Inventor: Soenghun Kim, Gyeonggi-do (KR)

(73) Assignee: BLACKPIN INC., Seoul (KR)

( * ) Notice: Subject to any disclaimer, the term of this patent is extended or adjusted under 35 U.S.C. 154(b) by 0 days.

(21) Appl. No.: 18/381,641

(22) Filed: Oct. 19, 2023

(65) Prior Publication Data

US 2024/0049064 A1 Feb. 8, 2024

Related U.S. Application Data

(63) Continuation of application No. 17/592,517, filed on Feb. 4, 2022, now Pat. No. 11,832,135.

(30) Foreign Application Priority Data

Aug. 5, 2021 (KR) .................. 10-2021-0103260

(51) Int. Cl.
*H04W 36/00* (2009.01)
*H04W 36/08* (2009.01)

(52) U.S. Cl.
CPC .. *H04W 36/0058* (2018.08); *H04W 36/00698* (2023.05); *H04W 36/08* (2013.01); *H04W 36/00837* (2018.08)

(58) Field of Classification Search
CPC ......... H04W 36/0069; H04W 36/0058; H04W 36/00837; H04W 36/08; H04W 36/00692; H04W 36/00695; H04W 36/00698; H04W 36/008375; H04W 36/00838; H04W 36/083; H04W 36/085; H04W 36/087; H04W 36/13

See application file for complete search history.

(56) References Cited

U.S. PATENT DOCUMENTS

2020/0396661 A1* 12/2020 Wu .................. H04W 36/0058
2021/0092631 A1* 3/2021 Tang .................... H04W 24/08
2021/0099926 A1* 4/2021 Chen ............... H04W 36/00698

FOREIGN PATENT DOCUMENTS

KR 1020200125659 A1 11/2020
KR 1020200132937 A1 11/2020

OTHER PUBLICATIONS

3rd Generation Partnership Project; Technical Specification Group Radio Access Network; Evolved Universal Terrestrial Radio Access (E-UTRA) and NR; Multi-connectivity;Stage 2 (Release 16), 3GPP TS 37.340 V16.6.0, Jun. 2021.

(Continued)

*Primary Examiner* — Ji-Hae Yea
(74) *Attorney, Agent, or Firm* — Nicholas Park

(57) ABSTRACT

A method and apparatus for secondary base station change in a mobile communication system are provided. Method for secondary node change includes receiving conditional reconfiguration information from the base station, performing evaluation based on the configuration generated by a second base station and transmitting a second response message with an identifier indicating which conditional reconfiguration is executed.

5 Claims, 10 Drawing Sheets

(56) References Cited

OTHER PUBLICATIONS

3rd Generation Partnership Project; Technical Specification Group Radio Access Network;NR;User Equipment (UE) radio access capabilities (Release 16), 3GPP TS 38.306 V16.4.0, Mar. 2021.
3rd Generation Partnership Project; Technical Specification Group Radio Access Network;NR;Radio Resource Control (RRC) protocol specification (Release 16), 3GPP TS 38.331 V 16.5.0, Jun. 2021.
3rd Generation Partnership Project; Technical Specification Group Radio Access Network;NG-RAN;NG Application Protocol (NGAP) (Release 16), 3GPP TS 38.413 V16.6.0, Jul. 2021.
3rd Generation Partnership Project; Technical Specification Group Radio Access Network;NG-RAN;Xn application protocol (XnAP) (Release 16), 3GPP TS 38.423 V16.6.0, Jul. 2021.
3rd Generation Partnership Project; Technical Specification Group Radio Access Network;NG-RAN;F1 application protocol (F1AP) (Release 16), 3GPP TS 38.473 V16.6.0, Jul. 2021.
3rd Generation Partnership Project; Technical Specification Group Radio Access Network; Evolved Universal Terrestrial Radio Access (E-UTRA); Radio Resource Control (RRC); Protocol specification (Release 16), 3GPP TS 36.331 V16.5.0, Jun. 2021.
CATT, "Report of [post109e@13][NR MOB] Resolving open issues for CPC", 3GPP TSG-RAN WG2 Meeting #109bis-e, R2-2003440, Apr. 10, 2020.
CATT, "TS 37.340 CR for CPA and inter-SN CPC", 3GPP TSG-RAN WG2 Meeting #114-e, R2-2105062, May 11, 2021.
ZTE Corporation etal, "Discussion on conditional PSCell addition/change", 3GPP TSG-RAN WG2 Meeting #113, R2-2101566, Jan. 15, 2021.

\* cited by examiner

User Plane Protocol Stack

Control Plane Protocol Stack

METHOD AND APPARATUS FOR SECONDARY BASE STATION CHANGE IN MOBILE WIRELESS COMMUNICATION SYSTEM

CROSS-REFERENCE TO RELATED APPLICATION

This patent application is a Continuation Application of U.S. patent application Ser. No. 17/592,517, filed on Feb. 4, 2022, now U.S. Pat. No. 11,832,135, which claims priority to and the benefit of Korean Patent Application No. 10-2021-0103260, filed on Aug. 5, 2021, the disclosure of which is incorporated herein by reference in its entirety.

BACKGROUND

The present disclosure relates to a mobile communication system with secondary base station change. More specifically, the present disclosure relates to a conditional secondary node change method and an apparatus for use in the mobile communication system.

To meet the increasing demand for wireless data traffic since the commercialization of 4th generation (4G) communication systems, the 5th generation (5G) system is being developed. For the sake of high, 5G system introduced millimeter wave (mmW) frequency bands (e. g. 60 GHz bands). In order to increase the propagation distance by mitigating propagation loss in the 5G communication system, various techniques are introduced such as beamforming, massive multiple-input multiple output (MIMO), full dimensional MIMO (FD-MIMO), array antenna, analog beamforming, and large-scale antenna. In addition, base station is divided into a central unit and plurality of distribute units for better scalability. To facilitate introduction of various services, 5G communication system targets supporting higher data rate and smaller latency.

SUMMARY

Aspects of the present disclosure are to address the problems of conditional secondary node change. Accordingly, an aspect of the present disclosure is to provide a method and an apparatus for providing the configuration information for conditional secondary node change.

In accordance with an aspect of the present disclosure, a method of a terminal in mobile communication system is provided. In the method, UE receives from the MN a 1st LTE DL message including a 1st NR DL message and a 1st identity, transmits to the MN a 2nd LTE UL message including the 1st identity, performs conditional reconfiguration evaluation based on measurement configuration configured by a SN or measurement configuration configured by the MN and transmits to the MN a 3rd LTE UL message including a 2nd identity. Conditional reconfiguration evaluation is performed based on measurement configuration configured by the SN if a 2nd information indicating measurement configuration being associated with SCG is included in a 1st NR control information. The 1st NR DL message includes a plurality of the 1st NR control informations, and each of the plurality of the 1st NR control informations includes a 2nd identity, a 2nd information and a 2nd NR downlink control message, and the 2nd identity is selected from a plurality of 2nd identities included in the 1st NR downlink control message.

According to embodiments of the present disclosure, conditional reconfiguration evaluation can be configured by SN.

According to embodiments of the present disclosure, MN can recognize which conditional reconfiguration is executed based on the 2nd identifier reported by UE.

DETAILED DESCRIPTION

Figure 1:
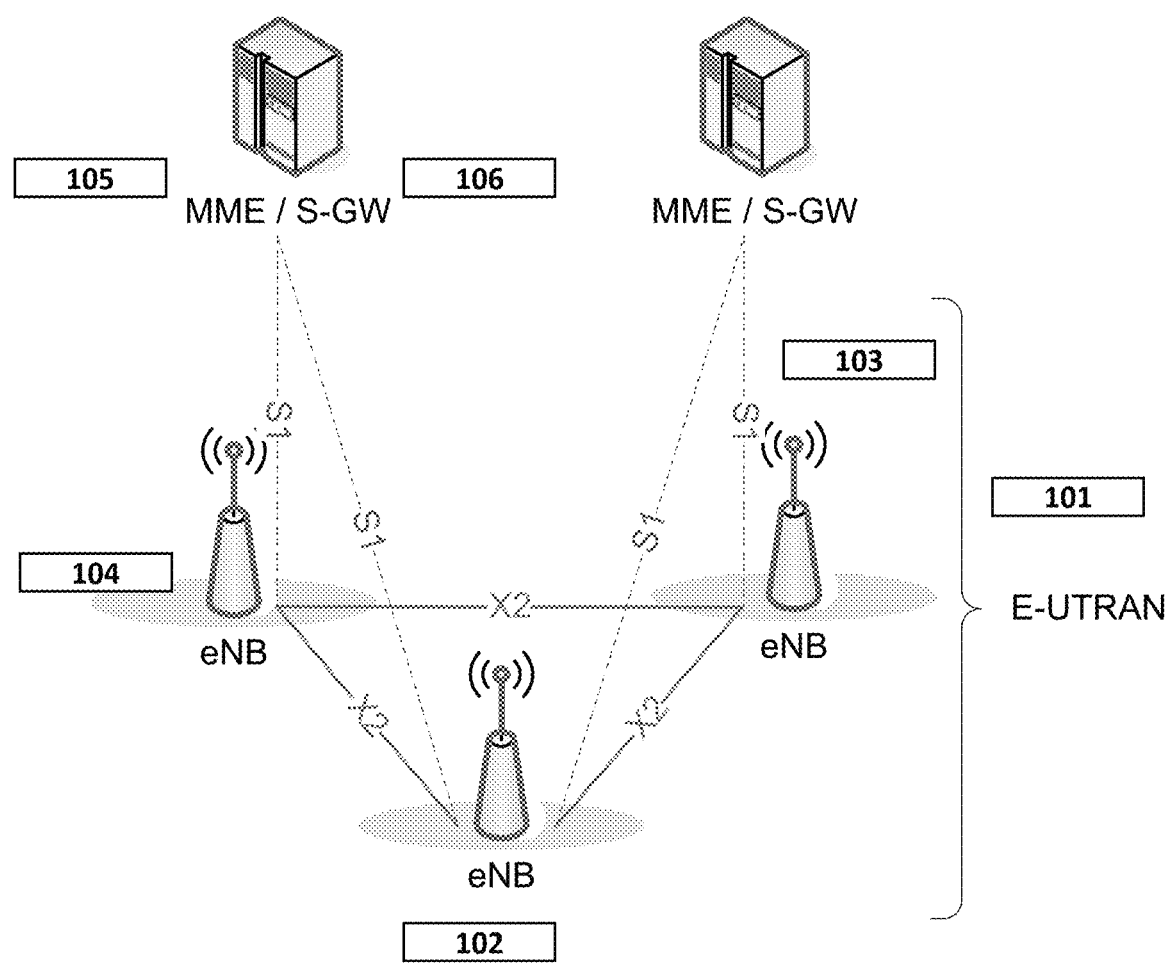
FIG. 1 is a diagram illustrating the architecture of an LTE system and an E-UTRAN to which the disclosure may be applied.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms used, in the following description, for indicating access nodes, network entities, messages, interfaces between network entities, and diverse identity information is provided for convenience of explanation. Accordingly, the terms used in the following description are not limited to specific meanings but may be replaced by other terms equivalent in technical meanings.

In the following descriptions, the terms and definitions given in the 3GPP standards are used for convenience of explanation. However, the present disclosure is not limited by use of these terms and definitions and other arbitrary terms and definitions may be employed instead.

Table 1 lists the acronyms used throughout the present disclosure.

TABLE 1

| Acronym | Full name |
| --- | --- |
| 5GC | 5G Core Network |
| 5GS | 5G System |
| 5QI | 5G QoS Identifier |
| ACK | Acknowledgement |
| AMF | Access and Mobility Management Function |
| ARQ | Automatic Repeat Request |
| AS | Access Stratum |
| ASN.1 | Abstract Syntax Notation One |
| BSR | Buffer Status Report |
| BWP | Bandwidth Part |
| CA | Carrier Aggregation |
| CAG | Closed Access Group |
| CAG-ID | Closed Access Group Identifier |
| CG | Cell Group |
| CHO | Conditional Handover |
| CIF | Carrier Indicator Field |
| CORESET | Control Resource Set |
| CPC | Conditional PSCell Change |
| CQI | Channel Quality Indicator |
| C-RNTI | Cell RNTI |
| CSI | Channel State Information |
| DC | Dual Connectivity |
| DCI | Downlink Control Information |
| DRB | (user) Data Radio Bearer |
| DRX | Discontinuous Reception |
| ECGI | E-UTRAN Cell Global Identifier |
| eNB | E-UTRAN NodeB |
| EN-DC | E-UTRA-NR Dual Connectivity |
| EPC | Evolved Packet Core |
| EPS | Evolved Packet System |
| E-RAB | E-UTRAN Radio Access Bearer |
| ETWS | Earthquake and Tsunami Warning System |
| E-UTRA | Evolved Universal Terrestrial Radio Access |
| E-UTRAN | Evolved Universal Terrestrial Radio Access Network |
| FDD | Frequency Division Duplex |
| FDM | Frequency Division Multiplexing |
| GBR | Guaranteed Bit Rate |
| HARQ | Hybrid Automatic Repeat Request |
| HPLMN | Home Public Land Mobile Network |
| IDC | In-Device Coexistence |
| IE | Information element |
| IMSI | International Mobile Subscriber Identity |
| KPAS | Korean Public Alert System |
| L1 | Layer 1 |
| L2 | Layer 2 |
| L3 | Layer 3 |
| LCG | Logical Channel Group |
| MAC | Medium Access Control |
| MBR | Maximum Bit Rate |
| MCG | Master Cell Group |
| MCS | Modulation and Coding Scheme |
| MeNB | Master eNB |
| MIB | Master Information Block |
| MIMO | Multiple Input Multiple Output |
| MME | Mobility Management Entity |
| MN | Master Node |
| MR-DC | Multi-Radio Dual Connectivity |
| NAS | Non-Access Stratum |
| NCGI | NR Cell Global Identifier |
| NE-DC | NR-E-UTRA Dual Connectivity |
| NGEN-DC | NG-RAN E-UTRA-NR Dual Connectivity |
| NG-RAN | NG Radio Access Network |
| NR | NR Radio Access |
| NR-DC | NR-NR Dual Connectivity |
| PBR | Prioritised Bit Rate |
| PCC | Primary Component Carrier |
| PCell | Primary Cell |
| PCI | Physical Cell Identifier |
| PDCCH | Physical Downlink Control Channel |
| PDCP | Packet Data Convergence Protocol |
| PDSCH | Physical Downlink Shared Channel |
| PDU | Protocol Data Unit |
| PLMN | Public Land Mobile Network |
| PRACH | Physical Random Access Channel |
| PRB | Physical Resource Block |
| PSCell | Primary SCG Cell |
| PSS | Primary Synchronisation Signal |
| PUCCH | Physical Uplink Control Channel |
| PUSCH | Physical Uplink Shared Channel |
| PWS | Public Warning System |
| QFI | QoS Flow ID |
| QoE | Quality of Experience |
| QoS | Quality of Service |
| RACH | Random Access Channel |
| RAN | Radio Access Network |
| RA-RNTI | Random Access RNTI |
| RAT | Radio Access Technology |
| RB | Radio Bearer |
| RLC | Radio Link Control |
| RNA | RAN-based Notification Area |
| RNAU | RAN-based Notification Area Update |
| RNTI | Radio Network Temporary Identifier |
| RRC | Radio Resource Control |
| RRM | Radio Resource Management |
| RSRP | Reference Signal Received Power |
| RSRQ | Reference Signal Received Quality |
| RSSI | Received Signal Strength Indicator |
| SCC | Secondary Component Carrier |
| SCell | Secondary Cell |
| SCG | Secondary Cell Group |
| SCS | Subcarrier Spacing |
| SDAP | Service Data Adaptation Protocol |
| SDU | Service Data Unit |
| SeNB | Secondary eNB |
| SFN | System Frame Number |
| S-GW | Serving Gateway |
| SI | System Information |
| SIB | System Information Block |
| (S-/T-) SN | (Source/Target) Secondary Node |
| SpCell | Special Cell |
| SRB | Signalling Radio Bearer |
| SRS | Sounding Reference Signal |
| SSB | SS/PBCH block |
| SSS | Secondary Synchronisation Signal |
| SUL | Supplementary Uplink |
| TDD | Time Division Duplex |
| TDM | Time Division Multiplexing |

TABLE 1-continued

| Acronym | Full name |
| --- | --- |
| TRP | Transmit/Receive Point |
| UCI | Uplink Control Information |
| UE | User Equipment |
| UL-SCH | Uplink Shared Channel |
| UPF | User Plane Function |

Table 2 lists the terminologies and their definition used throughout the present disclosure.

TABLE 2

| Terminology | Definition |
| --- | --- |
| Cell | combination of downlink and optionally uplink resources. The linking between the carrier frequency of the downlink resources and the carrier frequency of the uplink resources is indicated in the system information transmitted on the downlink resources. |
| Global cell identity | An identity to uniquely identifying an NR cell. It is consisted of cellIdentity and plmn-Identity of the first PLMN-Identity in plmn-IdentityList in SIB1. |
| gNB | node providing NR user plane and control plane protocol terminations towards the UE, and connected via the NG interface to the 5GC. |
| Information element | A structural element containing single or multiple fields is referred as information element. |
| NR | NR radio access |
| PCell | SpCell of a master cell group. |
| Primary SCG Cell | For dual connectivity operation, the SCG cell in which the UE performs random access when performing the Reconfiguration with Sync procedure. |
| Serving Cell | For a UE in RRC_CONNECTED not configured with CA/DC there is only one serving cell comprising of the primary cell. For a UE in RRC_CONNECTED configured with CA/DC the term 'serving cells' is used to denote the set of cells comprising of the Special Cell(s) and all secondary cells. |
| SpCell | primary cell of a master or secondary cell group. |
| Cell Group | in dual connectivity, a group of serving cells associated with either the MeNB or the SeNB. |
| En-gNB | node providing NR user plane and control plane protocol terminations towards the UE, and acting as Secondary Node in EN-DC. |
| Master Cell Group | in MR-DC, a group of serving cells associated with the Master Node, comprising of the SpCell (PCell) and optionally one or more SCells. |
| Master node | in MR-DC, the radio access node that provides the control plane connection to the core network. It may be a Master eNB (in EN-DC), a Master ng-eNB (in NGEN-DC) or a Master gNB (in NR-DC and NE-DC). |
| NG-RAN node | either a gNB or an ng-eNB. |
| PSCell | SpCell of a secondary cell group. |
| Secondary Cell | For a UE configured with CA, a cell providing additional radio resources on top of Special Cell. |
| Secondary Cell Group | in MR-DC, a group of serving cells associated with the Secondary Node, comprising of the SpCell (PSCell) and optionally one or more SCells. |
| Secondary node | in MR-DC, the radio access node, with no control plane connection to the core network, providing additional resources to the UE. It may be an en-gNB (in EN-DC), a Secondary ng-eNB (in NE-DC) or a Secondary gNB (in NR-DC and NGEN-DC). |
| Conditional PSCell Change | a PSCell change procedure that is executed only when PSCell execution condition(s) are met. |
| gNB Central Unit (gNB-CU) | a logical node hosting RRC, SDAP and PDCP protocols of the gNB or RRC and PDCP protocols of the en-gNB that controls the operation of one or more gNB-DUs. The gNB-CU terminates the F1 interface connected with the gNB-DU. |
| gNB Distributed Unit (gNB-DU) | a logical node hosting RLC, MAC and PHY layers of the gNB or en-gNB, and its operation is partly controlled by gNB-CU. One gNB-DU supports one or multiple cells. One cell is supported by only one gNB-DU. The gNB-DU terminates the F1 interface connected with the gNB-CU. |

Table 3 lists abbreviations of various messages, information elements and terminologies used throughout the present disclosure.

TABLE 3

| Abbreviation | Message/IE/Terminology |
| --- | --- |
| LTE RECNF | RRCConnectionReconfiguration |
| LTE RECNF CMP | RRCConnectionReconfigurationComplete |
| CAPENQ | UECapabilityEnquiry |
| CAPINF | UECapability Information |
| NR RECNF | RRCReconfiguration |
| NR RECNF CMP | RRCReconfigurationComplete |
| ULIT | ULInformation TransferMRDC |
| SGNB ADD REQ | SGNB ADDITION REQUEST |
| SGNB ADD REQ ACK | SGNB ADDITION REQUEST ACKNOWLEDGE |
| SGNB REL REQ | SGNB RELEASE REQUEST |
| SGNB REL REQ ACK | SGNB RELEASE REQUEST ACKNOWLEDGE |
| SGNB RECNF CMP | SGNB RECONFIGURATION COMPLETE |
| Transaction ID | rrc-TransactionIdentifier |
| TCSPCELL | Target Candidate SpCell |
| CRID | CondReconfigurationId |

Table 4 explains technical terminologies used throughout the present disclosure.

TABLE 4

| Terminology | Definition |
| --- | --- |
| PSCell change | It means the current PSCell changes to a new PSCell. It includes intra-SN PSCell change and inter-SN PSCell change. PSCell addition is also considered as PSCell change. |
| CG-ConfigInfo IE | The IE is transferred from MN to SN or from CU to DU. It includes following information ue-CapabilityInfo includes various information for UE capability MeasResultList2NR includes measurement results on the candidate cells for serving cell DRX configuration of MCG |
| CG-Config IE | The IE is transferred from SN to MN or from CU to DU. It includes following information NR RRCReconfiguration which includes SCG configuration informatino. MN transfer the NR RRCReconfiguration message to UE without modifying it Information related to SCG bearer. It includes the information indicating the security key for the bearer DRX configuration of SCG ARFCN indicating the center frequency of PSCell |
| measConfig | It is configuration related to measurement and set by MN and SN separately. It comprises at least one measurement object (measObject), at least one report configuration (ReportConfig) and at least one measurement identity (measId). A measObject is identified by a MeasObjectId. A reportConfig is identified by a ReportConfigId. A measId comprises a measObjectId and a reportConfigId. MeasId instructs UE to perform a specific operation when measurement result on the associated measObject fulfils condition set by ReportConfigId |
| TCSPCELL | It indicates target candidate SPCell. In the $1^{st}$ procedure, plurality of cells of a single target node can be configured as target candidate SpCell. TCSPCELL can be a cell selected, by MN or S-SN, among the cells for which UE report measurement result. Throughout the $1^{st}$ procedure, one of plurality of TCSPCELL becomes PSCell |

FIG. 1 is a diagram illustrating the architecture of an LTE system and an E-UTRAN to which the disclosure may be applied.

The E-UTRAN consists of eNBs (102, 103, 104), providing the E-UTRA user plane (PDCP/RLC/MAC/PHY) and control plane (RRC) towards the UE. The eNBs (102, 103, 104) are interconnected with each other by means of the X2 interface. The eNBs are also connected to the MME (Mobility Management Entity) (105) and to the Serving Gateway (S-GW) (106) by means of the S1. The S1 interface supports a many-to-many relation between MMEs/Serving Gateways and eNBs. MME (105) and S-GW (106) may be realized either as a physical node or as separate physical nodes.

The eNB (102, 103, 104) hosts the functions listed in table 5.

TABLE 5

Functions for Radio Resource Management such as Radio Bearer Control, Radio
Admission Control, Connection Mobility Control, Dynamic allocation of resources to
UEs in uplink, downlink and sidelink(scheduling)
IP and Ethernet header compression, uplink data decompression and encryption of user
data stream
Selection of an MME at UE attachment when no routing to an MME can be determined
from the information provided by the UE
Routing of User Plane data towards Serving Gateway
Scheduling and transmission of paging messages (originated from the MME)

The MME (105) hosts the functions such as NAS signaling, NAS signaling security, AS security control, S-GW selection, Authentication, Support for PWS message transmission and positioning management.

The S-GW (106) hosts the functions such as packet routing and forwarding, transport level packet marking in the uplink and the downlink, mobility anchoring for inter-eNB handover etc.

Figure 2:
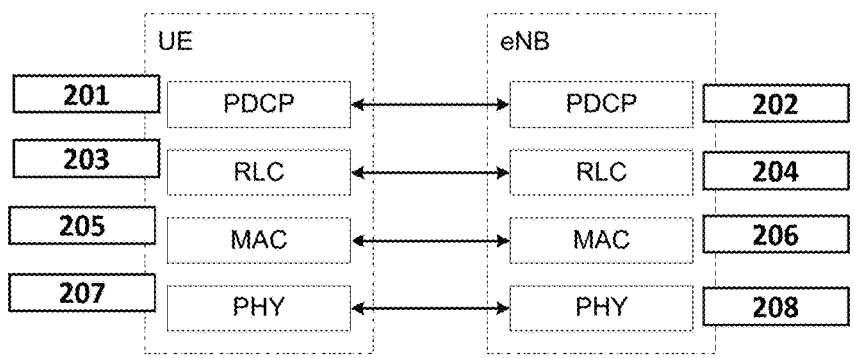
FIG. 2 is a diagram illustrating a wireless protocol architecture in an LTE system to which the disclosure may be applied.
Figure 2:
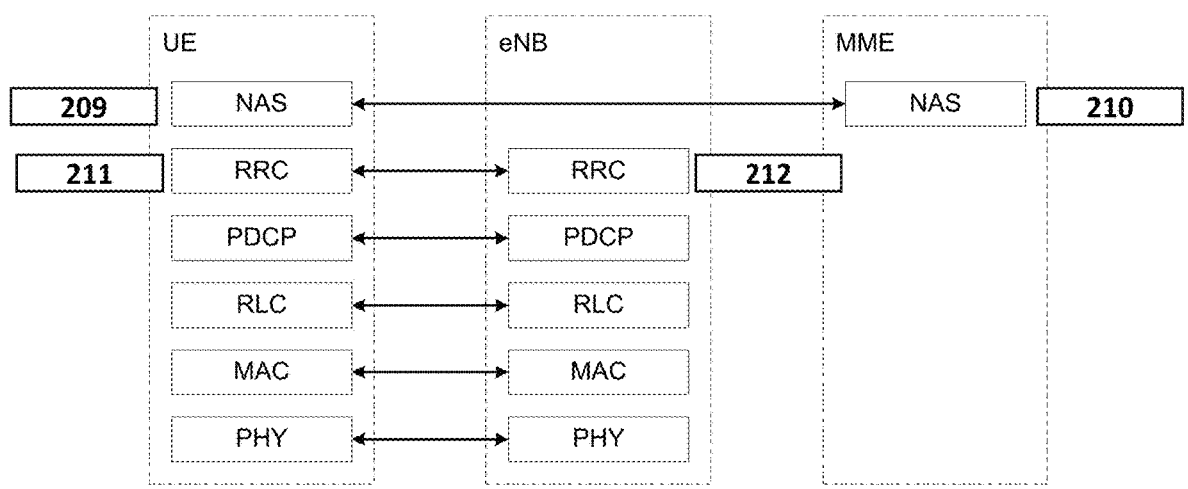

FIG. 2 is a diagram illustrating a wireless protocol architecture in an LTE system to which the disclosure may be applied.

User plane protocol stack consists of PDCP (201 or 202), RLC (203 or 204), MAC (205 or 206) and PHY (207 or 208). Control plane protocol stack consists of NAS (209 or 210), RRC (211 or 212), PDCP, RLC, MAC and PHY.

Each protocol sublayer performs functions related to the operations listed in the table 6.

TABLE 6

| Sublayer | Functions |
| --- | --- |
| NAS | authentication, mobility management, security control etc |
| RRC | System Information, Paging, Establishment, maintenance and release of an RRC connection, Security functions, Establishment, configuration, maintenance and release of Signalling Radio Bearers (SRBs) and Data Radio Bearers (DRBs), Mobility, QoS management, Detection of and recovery from radio link failure, NAS message transfer etc. |
| PDCP | Transfer of data, Header compression and decompression, Ciphering and deciphering, Integrity protection and integrity verification, Duplication, Reordering and in-order delivery, Out-of-order delivery etc. |
| RLC | Transfer of upper layer PDUs, Error Correction through ARQ, Re-segmentation of RLC data PDUs, Concatenation/Segmentation/Reassembly of SDU, RLC re-establishment etc. |
| MAC | Mapping between logical channels and transport channels, Multiplexing/demultiplexing of MAC SDUs belonging to one or different logical channels into/from transport blocks (TB) delivered to/from the physical layer on transport channels, Scheduling information reporting, Priority handling between UEs, Priority handling between logical channels of one UE etc. |
| PHY | Channel coding, Physical-layer hybrid-ARQ processing, Rate matching, Scrambling, Modulation, Layer mapping, Downlink Control Information, Uplink Control Information etc. |

Figure 3:
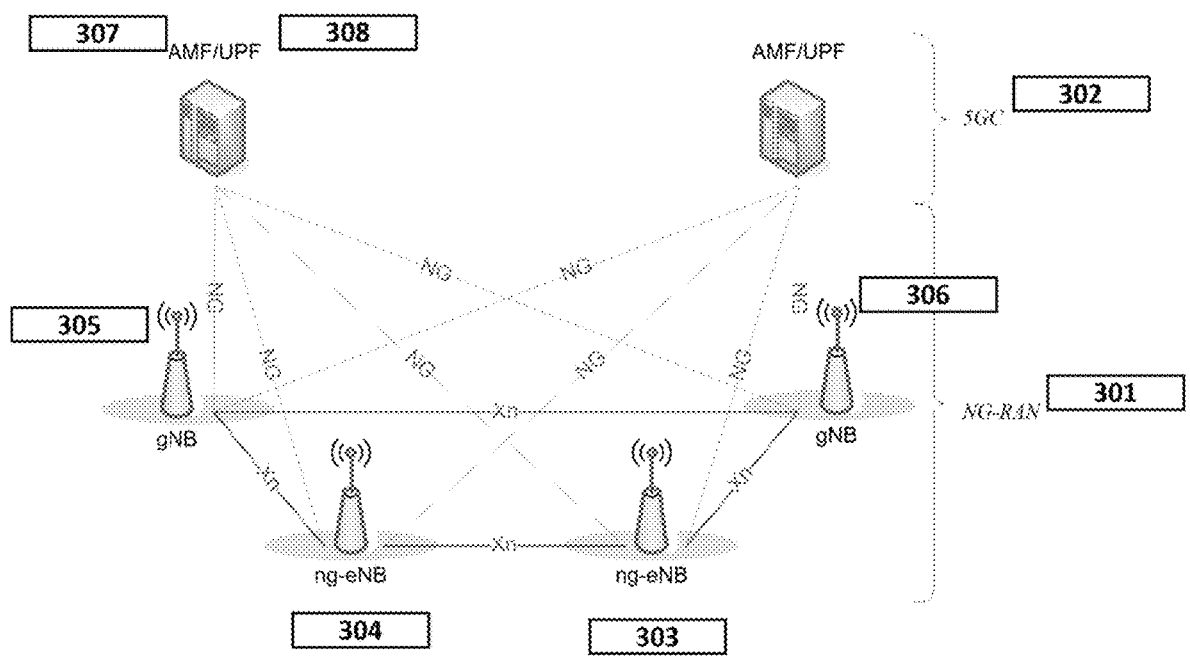
FIG. 3 is a diagram illustrating the architecture of an 5G system and a NG-RAN to which the disclosure may be applied.

FIG. 3 is a diagram illustrating the architecture of an 5G system and a NG-RAN to which the disclosure may be applied.

5G system consists of NG-RAN (301) and 5GC (302). An NG-RAN node is either:
- a gNB, providing NR user plane and control plane protocol terminations towards the UE; or
- an ng-eNB, providing E-UTRA user plane and control plane protocol terminations towards the UE.

The gNBs (305 or 306) and ng-eNBs (303 or 304) are interconnected with each other by means of the Xn interface. The gNBs and ng-eNBs are also connected by means of the NG interfaces to the 5GC, more specifically to the AMF (Access and Mobility Management Function) and to the UPF (User Plane Function). AMF (307) and UPF (308) may be realized as a physical node or as separate physical nodes.

A gNB (305 or 306) or an ng-eNBs (303 or 304) hosts the functions listed in table 7.

TABLE 7

| | |
| --- | --- |
| Resource related functions | Functions for Radio Resource Management such as Radio Bearer Control, Radio Admission Control, Connection Mobility Control, Dynamic allocation of resources to UEs in uplink, downlink and |

TABLE 7-continued

| | |
|---|---|
| | sidelink(scheduling) |
| PDCP related functions | IP and Ethernet header compression, uplink data decompression and encryption of user data stream |
| Core network related functions | Selection of an AMF at UE attachment when no routing to an MME can be determined from the information provided by the UE; and Routing of User Plane data towards UPF |
| other functions | Scheduling and transmission of paging messages; and Scheduling and transmission of broadcast information (originated from the AMF or O&M); and Measurement and measurement reporting configuration for mobility and scheduling; and Session Management; and QoS Flow management and mapping to data radio bearers; and Support of UEs in RRC_INACTIVE state; and Radio access network sharing; and Tight interworking between NR and E-UTRA; and Support of Network Slicing. |

The AMF (307) hosts the functions such as NAS signaling, NAS signaling security, AS security control, SMF selection, Authentication, Mobility management and positioning management.

The UPF (308) hosts the functions such as packet routing and forwarding, transport level packet marking in the uplink, QoS handling and the downlink, mobility anchoring for mobility etc.

Figure 4:
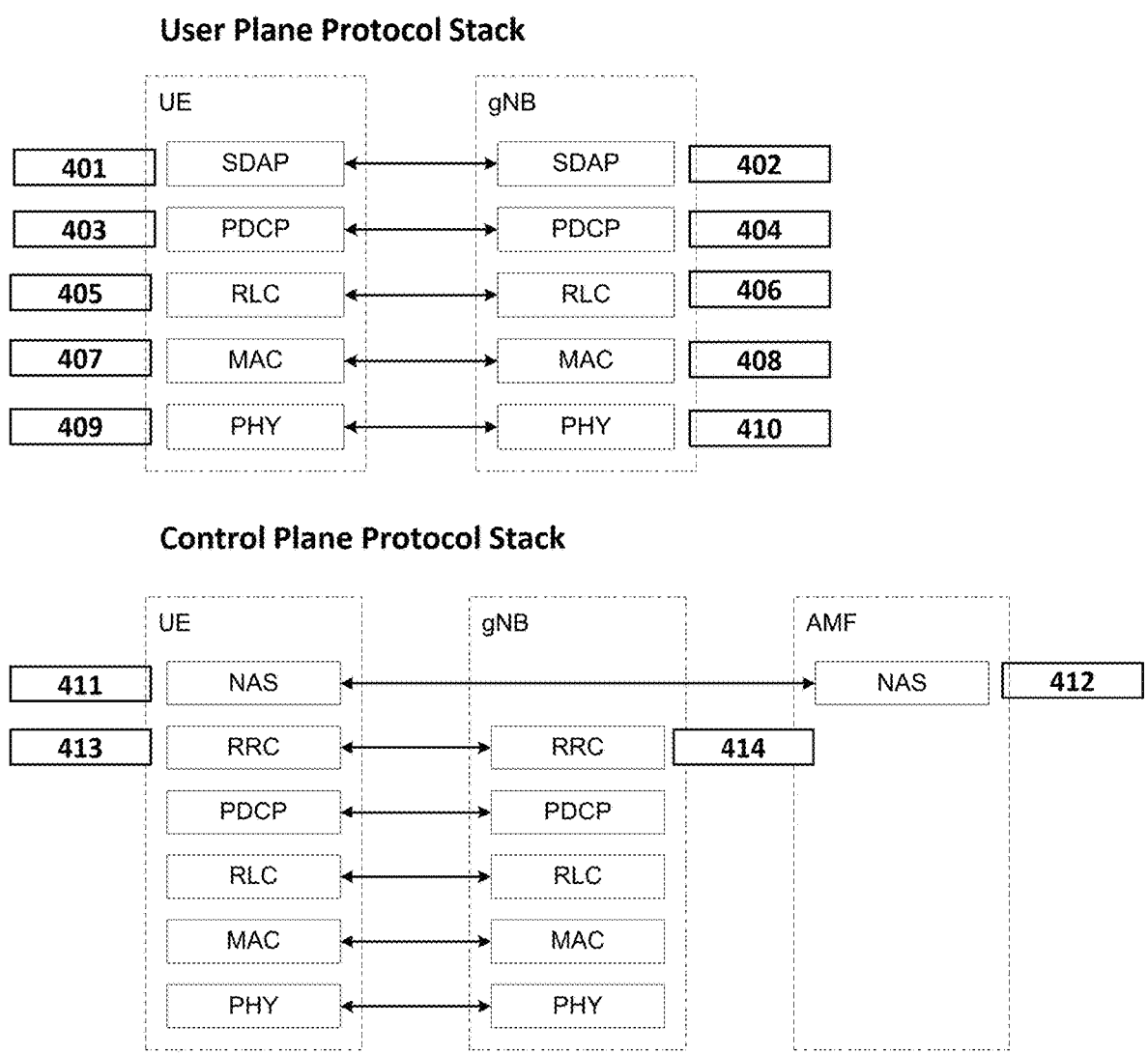
FIG. 4 is a diagram illustrating a wireless protocol architecture in an 5G system to which the disclosure may be applied.

FIG. 4 is a diagram illustrating a wireless protocol architecture in an 5G system to which the disclosure may be applied.

User plane protocol stack consists of SDAP (401 or 402), PDCP (403 or 404), RLC (405 or 406), MAC (407 or 408) and PHY (409 or 410). Control plane protocol stack consists of NAS (411 or 412), RRC (413 or 414), PDCP, RLC, MAC and PHY.

Each protocol sublayer performs functions related to the operations listed in the table 8.

TABLE 8

| Sublayer | Functions |
|---|---|
| NAS | authentication, mobility management, security control etc |
| RRC | System Information, Paging, Establishment, maintenance and release of an RRC connection, Security functions, Establishment, configuration, maintenance and release of Signalling Radio Bearers (SRBs) and Data Radio Bearers (DRBs), Mobility, QoS management, Detection of and recovery from radio link failure, NAS message transfer etc. |
| SDAP | Mapping between a QoS flow and a data radio bearer, Marking QoS flow ID (QFI) in both DL and UL packets. |
| PDCP | Transfer of data, Header compression and decompression, Ciphering and deciphering, Integrity protection and integrity verification, Duplication, Reordering and in-order delivery, Out-of-order delivery etc. |
| RLC | Transfer of upper layer PDUs, Error Correction through ARQ, Segmentation and re-segmentation of RLC SDUs, Reassembly of SDU, RLC re-establishment etc. |
| MAC | Mapping between logical channels and transport channels, Multiplexing/demultiplexing of MAC SDUs belonging to one or different logical channels into/from transport blocks (TB) delivered to/from the physical layer on transport channels, Scheduling information reporting, Priority handling between UEs, Priority handling between logical channels of one UE etc. |
| PHY | Channel coding, Physical-layer hybrid-ARQ processing, Rate matching, Scrambling, Modulation, Layer mapping, Downlink Control Information, Uplink Control Information etc. |

Figure 5:
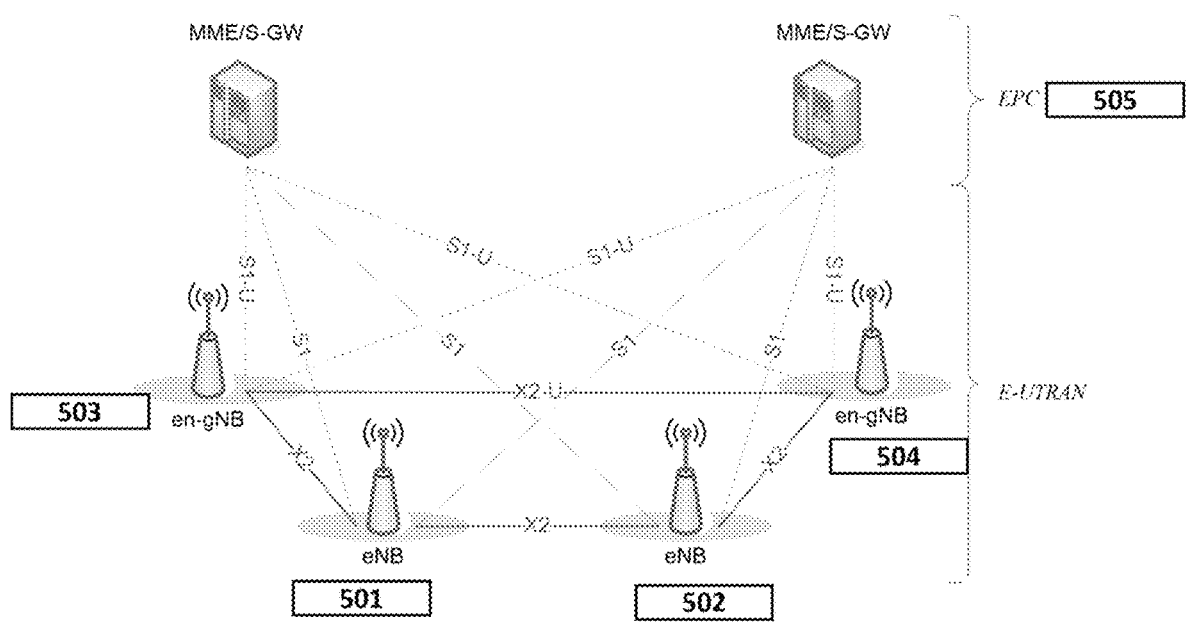
FIG. 5 is a diagram illustrating the architecture of an EN-DC to which the disclosure may be applied.

FIG. 5 is a diagram illustrating the architecture of an EN-DC to which the disclosure may be applied.

E-UTRAN supports MR-DC via E-UTRA-NR Dual Connectivity (EN-DC), in which a UE is connected to one eNB (501 or 502) that acts as a MN and one en-gNB (503 or 504) that acts as a SN. The eNB (501 or 502) is connected to the EPC (505) via the S1 interface and to the en-gNB (503 or 504) via the X2 interface. The en-gNB (503 or 504) might also be connected to the EPC (505) via the S1-U interface and other en-gNBs via the X2-U interface.

LTE and NR are expected to coexist for considerable time to come. A single operator could deploy both LTE and NR within its network. For such case, providing to a UE both stable connection with LTE and high data rate with NR is possible if UE is connected to both. EN-DC enables simultaneous data transfer via LITE and NR.

In EN-DC, frequent SN change could happen due to narrow coverage of NR. SN change requires PSCell change, so they are technically synonymous. PSCell change procedure in general is consisted with that MN or S-SN get aware that PSCell change is needed, that T-SN determines the configuration of the new PSCell and that MN informs UE the configuration of the new PSCell. Depending on a given circumstances, either immediately changing the PSCell upon receiving the PSCell configuration information or changing PSCell when certain condition is met could be appropriate. In the disclosure, the latter is 1$^{st}$ reconfiguration (delayed reconfiguration or conditional reconfiguration) and the former is $2^{nd}$ reconfiguration (or immediate reconfiguration or normal reconfiguration).

The disclosure provides operations of the terminal and the base station for the $1^{st}$ reconfiguration and for the $2^{nd}$ reconfiguration.

Figure 6:
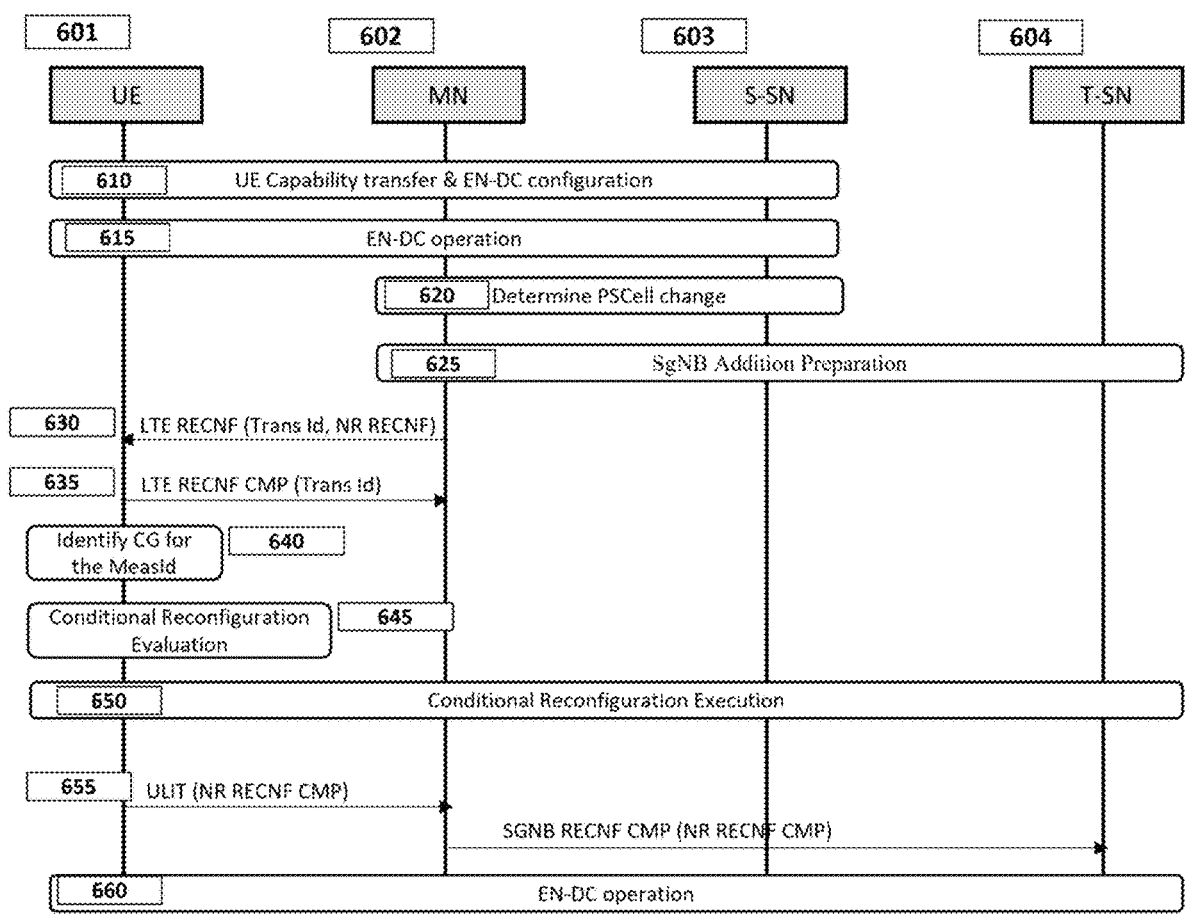
FIG. 6 is a diagram illustrating EN-DC operation performed by a UE and a base station according to the first embodiment of the present disclosure.

FIG. 6 is a diagram illustrating EN-DC operation performed by a UE and a base station according to the first embodiment of the present disclosure.

In 610, UE(601) and MN(602) perform UE capability transfer. MN sends UE a RRC message requesting UE to report UE capability. UE sends MN a RRC message called UECapabilityInformation which includes following information.

supportedBandCombinationList for EN-DC: Band combinations of E-UTRA bands and NR bands supporting EN-DC operation supportedBandCombinationList for Pt reconfiguration: list of indication, for each entry of supportedBandCombinationList, indicating whether $1^{st}$ reconfiguration is supported MN configures UE with EN-DC of a suitable band combination based on the above UE capability. EN-DC configuration procedure is consisted with a step where MN and SN exchange configuration information and a step where MN sends UE LTE RECNF. The LTE RECNF may include measConfig set by the MN and measConfig set by S-SN.

In 615, UE(601) and MN(602) and S-SN(603) performs EN-DC operation to transfer uplink data and downlink data. During the EN-DC operation, when a preconfigured event occurs, UE transmits, either to MN or to SN, MeasurementReport message carrying measurement results. Via the RRC message, the measurement results on the better neighbor cell than the current PSCell can be reported.

In 620, either MN or S-SN, based on the measurement results, determines that PSCell change procedure is to be triggered toward a cell of which T-SN.

In 625, MN, S-SN and T-SN performs SgNB addition preparation procedure. During the procedure, MN and T-SN exchange SGNB ADD REQ and SGNB ADD REQ ACK. SGNB ADD REQ may include measurement results reported by the UE and the information necessary for T-SN call admission control. SGNB ADD REQUEST ACKNOWLEDGE may include configuration information of a target PSCell or of plurality of target PSCells set by T-SN.

In 630, MN transmits LTE RECNF to UE. The details on LTE RECNF to configure a $1^{st}$ reconfiguration procedure to EN-DC UE is explained in FIG. 7

In 635, UE transmits MN LTE RECNF CMP. LTE RECNF CMP comprises a $1^{st}$ Transaction id. UE confirms MN, by transmitting the message, that UE successfully received the $1^{st}$ reconfiguration information.

In 640, UE determines execution condition based on a execution condition IE and a execution condition cell group IE. The execution condition IE comprises one or two MeasId (s). The execution condition cell group IE is information indicating either master cell group (or MN) or secondary cell group (or SN). Alternatively, the information indicates only master cell group and absence of the information can be interpreted as secondary cell group being indicated. MeasId in the execution condition IE is the MeasId of the MeasConfig of the cell group indicated by execution condition cell group IE. UE considers the MeasId of the indicated cell group's MeasConfig as the execution condition. UE recognize which measurement object to measure, and which condition triggers the $1^{st}$ reconfiguration execution based on the various parameters of MeasObject associated with the MeasId and based on the various parameters of ReportConfig associated with the MeasId.

The execution condition is determined by MN or S-SN. MN or S-SN express the determined execution condition using a MeasId defined in its MeasConfig. UE needs to know which node between MN and SN sets the execution condition to recognize what the MeasId really means. In the disclosure, above information is indicated to the UE via execution condition cell group IE.

In LTE, MeasId indicating a value between 1 and 32 and MeasId-v1250 indicating a value between 33 and 64 are defined. In the disclosure, former is $1^{st}$ 5 bit measId and latter is $2^{nd}$ 5 bit measId. In NR, MeasId indicating a value between 1 and 64 is defined. In the disclosure, it is 6 bit measId.

MN can inform T-SN measId for execution condition via SGNB ADD REQ. MN can transform a $1^{st}$ 5 bit measId or a $2^{nd}$ 5 bit measId to 6 bit measId and include it in SGNB ADD REQ. If MN selects a 1st 5 bit measId for execution condition, MN sets the MSB of 6 bit measId to 0 and sets remaining of 6 bit measId to the $1^{st}$ 5 bit measId. If MN selects a $2^{nd}$ 5 bit measId for execution condition, MN sets the MSB of 6 bit measId to 1 and sets remaining of 6 bit measId to the $2^{nd}$ 5 bit measId.

UE receives 6 bit measId for the execution condition via RECNF. If the execution condition is determined by S-SN, UE determines the execution condition without transforming 6 bit measId. If the execution condition is determined by MN, UE determines the execution condition by transforming 6 bit measId either to 1st 5 bit measId or to 2 nd 5 bit measId.

In 645, UE performs conditional reconfiguration evaluation to decide whether the condition applicable for this event is fulfilled. UE decides whether measurement result of a candidate PSCell specified in $3^{rd}$ NR RECNF fulfills the execution condition and move forward to 650 if so.

In 650, UE executes conditional reconfiguration by applying $2^{nd}$ NR RECNF of a cell fulfilling the execution condition and performs PSCell change procedure toward the cell. UE performs random access procedure with the target PSCell and moves forward to 655 upon successful completion of the random access procedure.

In 655, UE transmits ULIT to MN. ULIT includes NR RECNF CMP and CRID. MN identify CG-Config corresponding to CRID and reconfigure MN configuration according to the identified CG-Config. NR RECNF is the response to the NR RECNF having applied in 650. Therefore, Transaction id of NR RECNF CMP is different from Transaction id of LTE RECNF CMP. MN includes the NR RECNF CMP in SGNB RECNF CMP and forward it to T-SN.

In 660, UE, MN and T-SN performs EN-DC operation.

In 630, if conditional reconfiguration information is not included in 1st NR RECNF, UE performs 2nd reconfiguration procedure. UE performs random access procedure in PSCell of T-SN. Upon completion of random access procedure, UE transmits LTE RECNF CMP to MN and resume EN-DC via new PSCell. NR RECNF CMP is included in the LTE RECNF CMP. MN forwards the NR RECNF CMP to T-SN.

Figure 7:
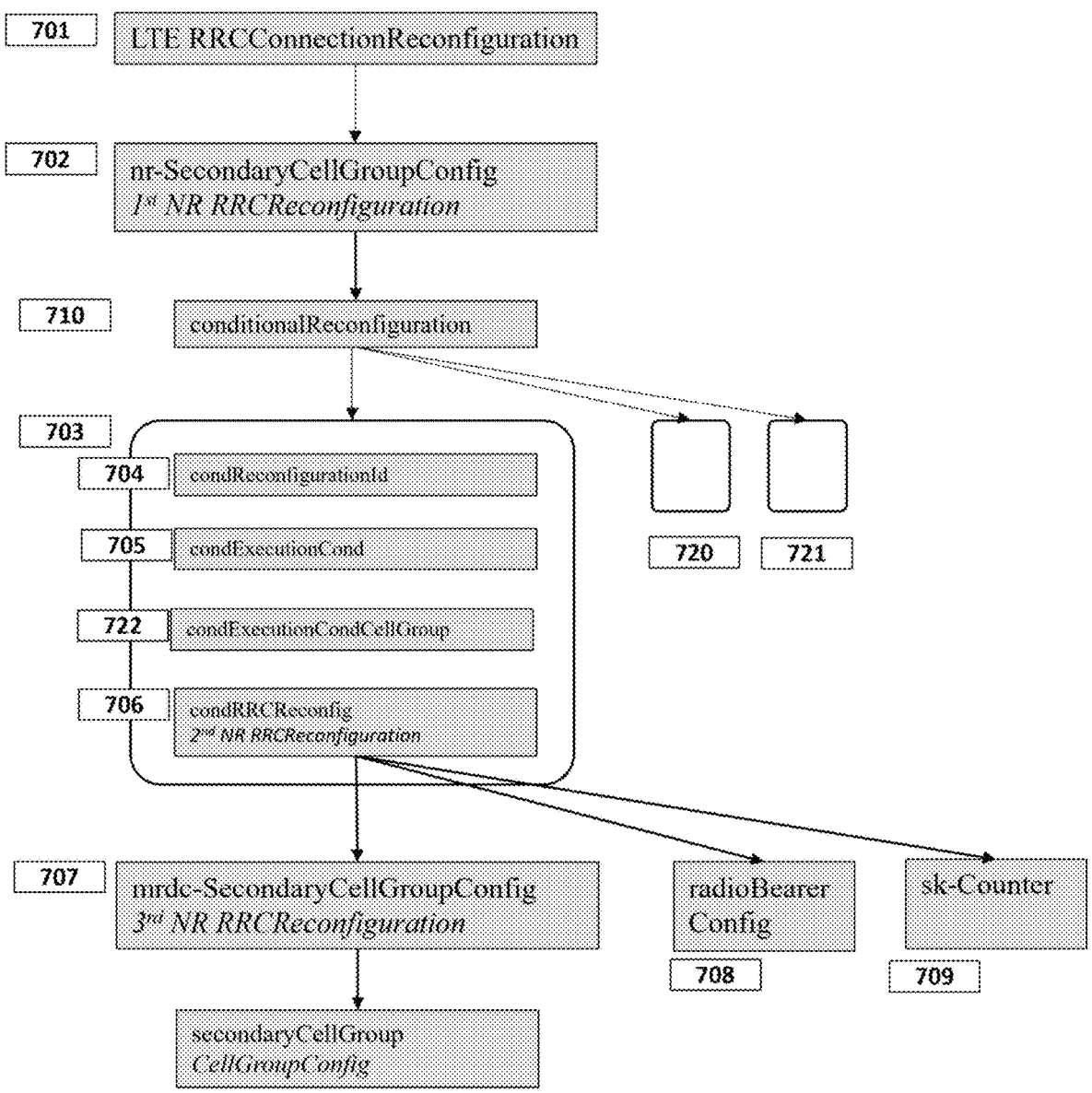
FIG. 7 is a diagram illustrating a structure of LTE reconfiguration message for the 1st reconfiguration procedure.

FIG. 7 is a diagram illustrating a structure of LTE reconfiguration message for the 1st reconfiguration procedure LTE RECNF includes $1^{st}$ Transaction id generated by MN and $1^{st}$ NR RECNF (702) generated by T-SN. $1^{st}$ NR RECNF includes various information depending on the purpose of the related procedure. For the $1^{st}$ reconfiguration, $1^{st}$ NR RECNF includes conditionalReconfiguration (710) which includes at least one CondReconfigToAddMod IE (703 or 720 or 721).

Each CondReconfigToAddMod IE includes conditional Reconfiguration Identity (or $2^{nd}$ NR control information identity) (704), execution condition (705), execution condition cell group (722) and $2^{nd}$ NR RECNF (706) carrying various configuration information. $2^{nd}$ NR control information identity is mandatorily present. Execution condition, $2^{nd}$ NR RECNF and execution condition cell group are optionally present. If the $2^{nd}$ NR control information identity included in the $2^{nd}$ NR control information is new identity, execution condition and $2^{nd}$ NR RECNF are mandatorily present and execution condition cell group is optionally present.

The $2^{nd}$ NR RECNF includes radio bearer configuration (708), counter for security key (709) and $3^{rd}$ NR RECNF (707). The $3^{rd}$ NR RECNF includes secondaryCellGroup IE which includes configuration information of TCSPCELL.

Therefore, a single $1^{st}$ NR RECNF for $1^{st}$ reconfiguration procedure includes plurality of TCSPCELL configuration information. Each of plurality of TCSPCELL configuration information is associated with a single execution condition IE and a single execution condition cell group IE.

Figure 8:
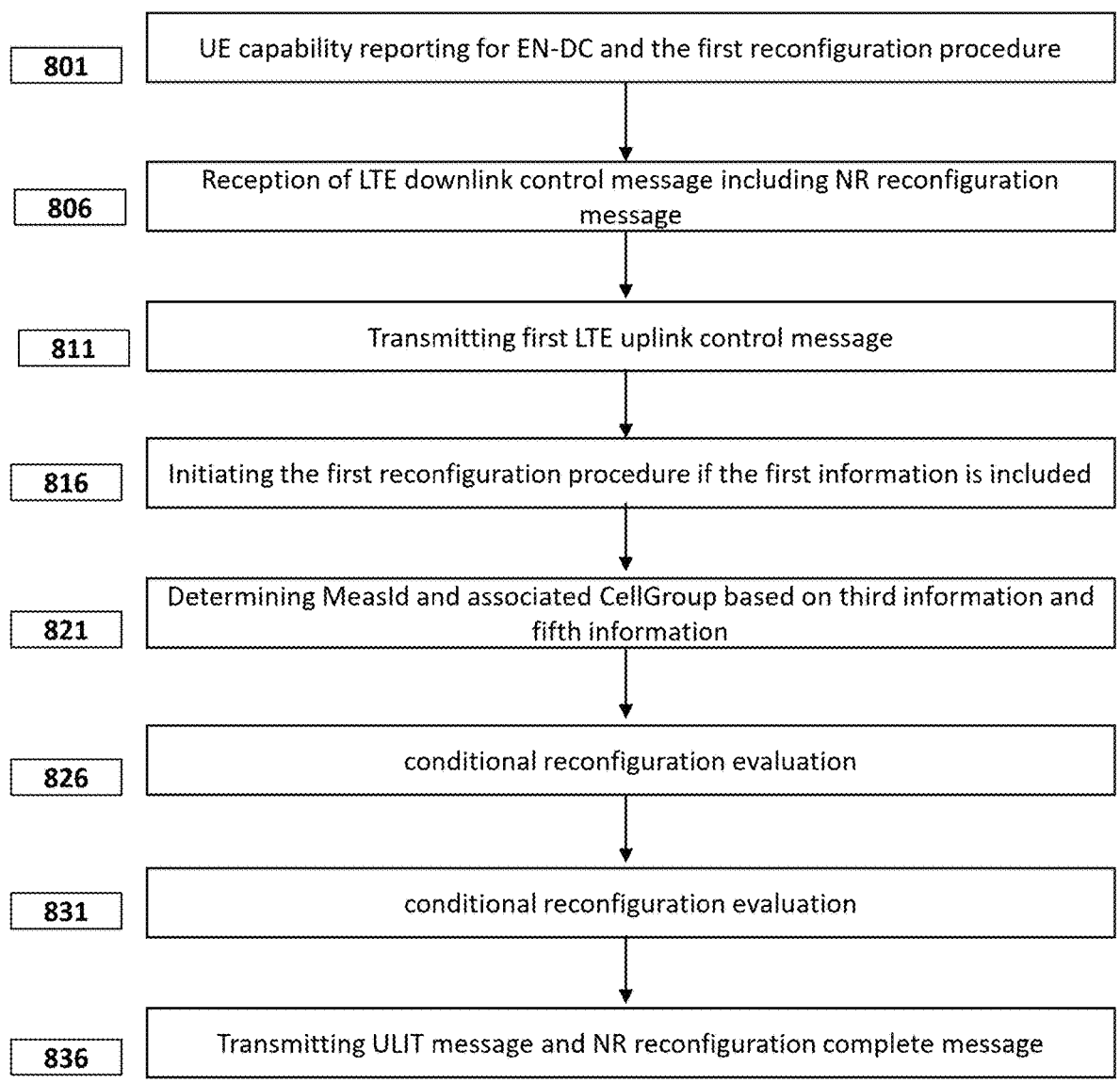
FIG. 8 is a flow diagram illustrating an operation of a terminal according to the first embodiment of the present disclosure.

The $1^{st}$ NR RECNF includes $2^{nd}$ Transaction ID, the $2^{nd}$ NR RECNF includes $3^{rd}$ Transaction ID and the $3^{rd}$ NR RECNF includes $4^{th}$ Transaction ID, FIG. 8 is a flow diagram illustrating an operation of a terminal according to the first embodiment of the present disclosure.

In 801, UE reports, to $1^{st}$ base station (MN or MeNB), UE capability related to EN-DC and $1^{st}$ reconfiguration procedure.

- $1^{st}$ capability information: a list of band combinations supporting EN-DN
- $2^{nd}$ capability information: a list of band combinations supporting $1^{st}$ reconfiguration and EN-DC or list of EN-DC band combinations supporting $1^{st}$ reconfiguration
- $3^{rd}$ capability information: a list of band combinations comprising two NR bands $2^{nd}$ capability information indicates NR band of which band combination, included in the $1^{st}$ capability information, supports $1^{st}$ reconfiguration procedure. $2^{nd}$ capability information indicates intra-band $1^{st}$ reconfiguration support.

$3^{rd}$ capability information is list of band combinations with two NR bands and each band combination indicates inter-band $1^{st}$ reconfiguration is supported between the NR bands. For example, if (N1, N2) is included in $3^{rd}$ capability information, inter-band $1^{st}$ reconfiguration between N1 and N2 is supported. NR bands included in the band combinations of $3^{rd}$ capability information are the NR bands supporting EN-DC.

A base station to which UE reports its capability, a base station from which UE receives LTE RECNF and a base station with which UE performs random access can be different base stations. The reason is because the capability reported by UE is stored in the core network and capability reporting is performed in the initial registration and not performed afterward.

In 806, UE receives LTE RECNF. The LTE RECNF includes $1^{st}$ NR RECNF. The $1^{st}$ NR RECNF includes $1^{st}$ information if the $1^{st}$ NR RECNF is for $1^{st}$ reconfiguration. The $1^{st}$ information includes at least one $2^{nd}$ information. In the $2^{nd}$ information, a $3^{rd}$ information and a $4^{th}$ information are mandatorily present, and a $5^{th}$ information is optionally present.

A $2^{nd}$ information corresponds to a TCSPCELL. A $3^{rd}$ information comprising one or two MeasId defines the execution condition for the TCSPCELL. A $4^{th}$ information is the $2^{nd}$ NR RECNF which includes radio bearer configuration, security key information and $3^{rd}$ NR RECNF for the configuration information of TCSPCELL. $5^{th}$ information indicates for which between MCG and SCG (or between MeNB and SgNB or between MN and S-SN) the execution condition is related to.

Each $3^{rd}$ information and each $5^{th}$ information define the execution condition for each associated TCSPCELL (or associated $2^{nd}$ information). Alternatively, it is also possible to define a common $3^{rd}$ information and a common $5^{th}$ information applicable to all TCSPCELL (or all $2^{nd}$ information) included in the $1^{st}$ NR RECNF. It is possible to define he common $3^{rd}$ information and the common $5^{th}$ information as sub-IE of $1^{st}$ information. Then UE ignores individual $3^{rd}$ information included under $2^{nd}$ information. UE applies common $3^{rd}$ information, if present, to all TCSPCELLs included in $1^{st}$ information. Otherwise, UE applies the $3^{rd}$ information included for each TCSPCELL.

A single LTE RECNF includes a single $1^{st}$ NR RECNF. A single $1^{st}$ NR RECNF includes plurality of $2^{nd}$ NR RECNFs. A single $2^{nd}$ NR RECNF includes a single $3^{rd}$ NR RECNF. Therefore, a single LTE RECNF includes a plurality of $3^{rd}$ NR RECNFs, a plurality of $3^{rd}$ information, a plurality of $4^{th}$ information and a plurality of $5^{th}$ information. The number of $3^{rd}$ NR RECNFs, the number of $3^{rd}$ information and the number of $4^{th}$ information are same while the number of $5^{th}$ information may be different.

A single RECNF includes a single Transaction id. The LTE RECNF includes $1^{st}$ Transaction id. The $1^{st}$ NR RECNF includes $2^{nd}$ Transaction id. The $2^{nd}$ NR RECNF includes $3^{rd}$ Transaction id. The $3^{rd}$ NR RECNF includes $4^{th}$ Transaction id.

In 811, UE transmits LTE RECNF CMP to the $1^{st}$ base station. The LTE RECFN CMP includes $1^{st}$ Transaction id.

In 816, UE initiates $1^{st}$ reconfiguration if $1^{st}$ reconfiguration information is included in $1^{st}$ NR RECNF in $1^{st}$ LTE RECNF received by UE In 821, UE determines, based on $3^{rd}$ information and $5^{th}$ information, to which cell group (or which node) MeasId indicated in the $3^{rd}$ information is related. If $5^{th}$ information is absent, UE determines that execution condition for the corresponding TCSPCELL is set by S-SN and that the MeasId is related to source SCG (or S-SN). UE interprets MeasId according to MeasConfig of source SCG (or S-SN). If $5^{th}$ information is present, UE determines that execution condition for the corresponding TCSPCELL is set by MN and that the MeasId is related to MCG (or MN). UE interprets MeasId according to MeasConfig of MCG (or MN). Alternatively, if $5^{th}$ information is present, UE determines that execution condition for the corresponding TCSPCELL is set by a CG (or by a node) between MCG and SCG (or between MN and S-SN) and UE interprets MeasId according to the MeasConfig of determined CG (or determined node).

MN informs T-SN MeasId for execution condition using SGNB ADD REQ by including 6 bit measId transformed from either $1^{st}$ 5 bit measId or $2^{nd}$ 5 bit measId. MN set MSB of 6 bit measId to 0 and set remaining bit to $1^{st}$ 5 bit measId if $1^{st}$ 5 bit measId is selected. MN set MSB of 6 bit measId to 1 and set remaining bit to $2^{nd}$ 5 bit measId if $2^{nd}$ 5 bit measId is selected.

UE receives 6 bit measId for execution condition in RECNF. If the execution condition is determined by S-SN, UE determines the execution condition with 6 bit measId as it is. If the execution condition is determined by MN, UE determines the execution condition with $1^{st}$ 5 bit measId or $2^{nd}$ 5 bit measId transformed from 6 bit measId. If MSB of 6 bit measId is 0, UE takes the remaining 5 bit as 1st 5 bit measId and selects associated ReportConfig and MeasObject accordingly. If MSB of 6 bit measId is 1, UE takes the remaining 5 bit as 2nd 5 bit measId and selects associated ReportConfig and MeasObject accordingly.

In 826, UE performs conditional reconfiguration evaluation. For each $2^{nd}$ information included in $1^{st}$ information, UE considers the serving cell indicated in $3^{rd}$ NR RECNF of $2^{nd}$ information (i.e. target candidate cell) as applicable cell. UE consider the target candidate cell as a triggered cell if event associated with the trigger condition for the cell is fulfilled.

In 831, UE executes conditional reconfiguration. UE apply the $2^{nd}$ NR RECNF for the triggered cell.

In 836, UE transmits to $2^{nd}$ base station ULIT. ULIT includes $1^{st}$ NR RECNF CMP. $1^{st}$ NR RECNF CMP includes $3^{rd}$ Transaction id. ULIT also includes CRID corresponding to triggered cell (or $2^{nd}$ NR RECFN corresponding to triggered cell)

Figure 9:
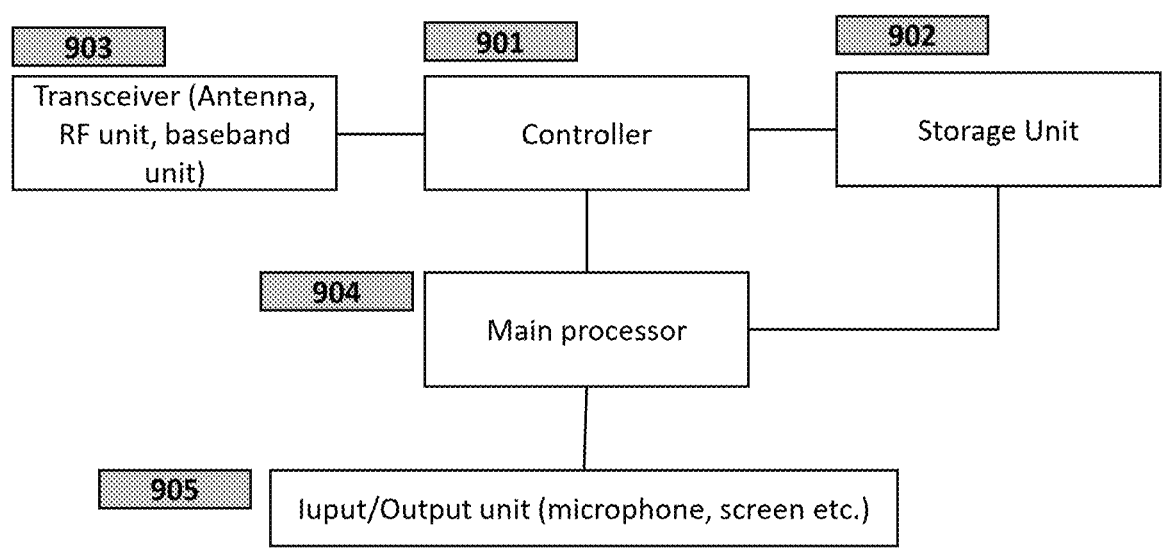
FIG. 9 is a block diagram illustrating the internal structure of a UE to which the disclosure is applied.

FIG. 9 is a block diagram illustrating the internal structure of a UE to which the disclosure is applied.

Referring to the diagram, the UE includes a controller (901), a storage unit (902), a transceiver (903), a main processor (904) and I/O unit (905).

The controller (901) controls the overall operations of the UE in terms of mobile communication. For example, the controller (901) receives/transmits signals through the transceiver (903). In addition, the controller (901) records and reads data in the storage unit (902). To this end, the controller (901) includes at least one processor. For example, the controller (901) may include a communication processor (CP) that performs control for communication and an application processor (AP) that controls the upper layer, such as an application program. The controller controls storage unit and transceiver such that UE operations illustrated in FIG. 8 is performed.

The storage unit (902) stores data for operation of the UE, such as a basic program, an application program, and configuration information. The storage unit (902) provides stored data at a request of the controller (901).

The transceiver (903) consists of a RF processor, a baseband processor and plurality of antennas. The RF processor performs functions for transmitting/receiving signals through a wireless channel, such as signal band conversion, amplification, and the like. Specifically, the RF processor up—converts a baseband signal provided from the baseband processor into an RF band signal, transmits the same through an antenna, and down—converts an RF band signal received through the antenna into a baseband signal. The RF processor may include a transmission filter, a reception filter, an amplifier, a mixer, an oscillator, a digital-to-analog converter (DAC), an analog-to-digital converter (ADC), and the like. The RF processor may perform MIMO and may receive multiple layers when performing the MIMO operation. The baseband processor performs a function of conversion between a baseband signal and a bit string according to the physical layer specification of the system. For example, during data transmission, the baseband processor encodes and modulates a transmission bit string, thereby generating complex symbols. In addition, during data reception, the baseband processor demodulates and decodes a baseband signal provided from the RF processor, thereby restoring a reception bit string.

The main processor (904) controls the overall operations other than mobile operation. The main processor (904) process user input received from I/O unit (905), stores data in the storage unit (902), controls the controller (901) for required mobile communication operations and forward user data to I/O unit (905).

I/O unit (905) consists of equipment for inputting user data and for outputting user data such as a microphone and a screen. I/O unit (905) performs inputting and outputting user data based on the main processor's instruction.

Figure 10:
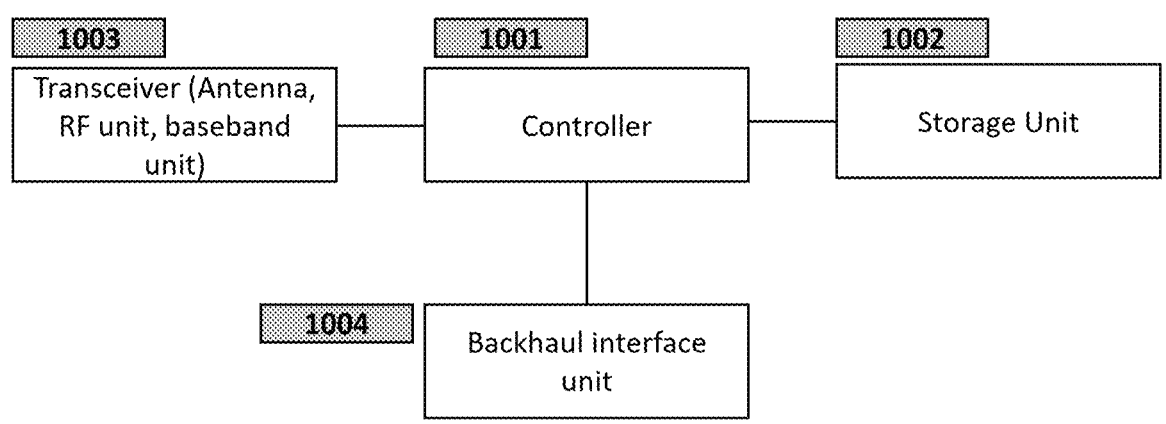
FIG. 10 is a block diagram illustrating the configuration of a base station according to the disclosure.

FIG. 10 is a block diagram illustrating the configuration of a base station according to the disclosure.

As illustrated in the diagram, the base station includes a controller (1001), a storage unit (1002), a transceiver (1003) and a backhaul interface unit (1004).

The controller (1001) controls the overall operations of the main base station. For example, the controller (1001) receives/transmits signals through the transceiver (1003), or through the backhaul interface unit (1004). In addition, the controller (1001) records and reads data in the storage unit (1002). To this end, the controller (1001) may include at least one processor. The controller controls transceiver, storage unit and backhaul interface such that base station operation illustrated in FIG. 6 are performed.

The storage unit (1002) stores data for operation of the main base station, such as a basic program, an application program, and configuration information. Particularly, the storage unit (1002) may store information regarding a bearer allocated to an accessed UE, a measurement result reported from the accessed UE, and the like. In addition, the storage unit (1002) may store information serving as a criterion to deter mine whether to provide the UE with multi-connection or to discontinue the same. In addition, the storage unit (1002) provides stored data at a request of the controller (1001).

The transceiver (1003) consists of a RF processor, a baseband processor and plurality of antennas. The RF processor performs functions for transmitting/receiving signals through a wireless channel, such as signal band conversion, amplification, and the like. Specifically, the RF processor up—converts a baseband signal provided from the baseband processor into an RF band signal, transmits the same through an antenna, and down—converts an RF band signal received through the antenna into a baseband signal. The RF processor may include a transmission filter, a reception filter, an amplifier, a mixer, an oscillator, a DAC, an ADC, and the like. The RF processor may perform a down link MIMO operation by transmitting at least one layer. The baseband processor performs a function of conversion between a baseband signal and a bit string according to the physical layer specification of the first radio access technology. For example, during data transmission, the baseband processor encodes and modulates a transmission bit string, thereby generating complex symbols. In addition, during data reception, the baseband processor demodulates and decodes a baseband signal provided from the RF processor, thereby restoring a reception bit string.

The backhaul interface unit (1004) provides an interface for communicating with other nodes inside the network. The backhaul interface unit (1004) converts a bit string transmitted from the base station to another node, for example, another base station or a core network, into a physical signal, and converts a physical signal received from the other node into a bit string.

What is claimed is:

1. A method performed by a terminal, the method comprising:

transmitting to a Master Node (MN) a first Uplink (UL) message, wherein the first UL message comprises terminal capability information on a Primary Secondary Cell Group Cell (PSCell) conditional reconfiguration;

receiving from the MN a first Downlink (DL) message, wherein the first DL message comprises a first identifier and a Conditional Reconfiguration Information Element (IE), and wherein the Conditional Reconfiguration IE comprises information relating to execution condition and a second DL message, and wherein the second DL message comprises a second identifier, a configuration of a first cell, a configuration of a radio bearer, and security key information;

transmitting to the MN a second UL message in response to reception of the first DL message, wherein the second UL message comprises the first identifier;

performing conditional reconfiguration evaluation based on a measurement configuration associated with a Secondary Cell Group (SCG) in case that a first information indicating that a measurement identifier refers to the measurement configuration associated with the SCG is comprised in the Conditional Reconfiguration IE;

determining the first cell to be a triggered cell in case that execution condition is fulfilled;

performing conditional reconfiguration execution based on the configuration of the first cell, the configuration of the radio bearer, and the security key information; and transmitting to the MN a third UL message, wherein the third UL message comprises an identifier corresponding to the triggered cell and a fourth UL message, wherein the fourth UL message comprises the second identifier of the second DL message.

2. The method of claim 1,
wherein the terminal capability information comprises a first list and a second list, wherein the first list comprises one or more band combinations and the second list comprises one or more indications, wherein each of the one or more indications in the second list indicates whether conditional PSCell reconfiguration is supported for a corresponding band combination of the one or more band combinations in the first list.

3. The method of claim 1, wherein the conditional reconfiguration evaluation is performed based on a measurement configuration associated with a master cell group in case that the first information indicating that a measurement identifier refers to the measurement configuration associated with the SCG is not comprised in the Conditional Reconfiguration IE.

4. The method of claim 1,
wherein the execution condition is determined based on:
a 6bit measurement identifier in case that the measurement configuration configured by a Secondary Node (SN) is used; and
a 5bit measurement identifier in case that the measurement configuration configured by the MN is used.

5. A terminal in a wireless communication system, the terminal comprising:
a transceiver configured to transmit and receive a signal; and
a controller configured to control the transceiver to:
transmit to a Master Node (MN) a first Uplink (UL) message, wherein the first UL message comprises terminal capability information on a Primary Secondary Cell Group Cell (PSCell) conditional reconfiguration;
receive from the MN a first Downlink (DL) message, wherein the first DL message comprises a first identifier and at least one-a Conditional Reconfiguration Information Element (IE), and wherein the Conditional Reconfiguration IE comprises information relating to execution condition and a second DL message, and wherein the second DL message comprises a second identifier, a configuration of a first cell, a configuration of a radio bearer, and security key information;
transmit to the MN a second UL message in response to reception of the first DL message, wherein the second UL message comprises the first identifier;
perform conditional reconfiguration evaluation based on a measurement configuration associated with a Secondary Cell Group (SCG) in case that a first information indicating that a measurement identifier refers to the measurement configuration associated with the SCG is comprised in the Conditional Reconfiguration IE;
determine the first cell to be a triggered cell in case that execution condition is fulfilled;
perform conditional reconfiguration execution based on the configuration of the first cell, the configuration of the radio bearer, and the security key information; and
transmit to the MN a third UL message, wherein the third UL message comprises an identifier corresponding to the triggered cell and a fourth UL message, wherein the fourth UL message comprises the second identifier of the second DL message.

* * * * *